US010579358B2

(12) United States Patent
Kadam et al.

(10) Patent No.: US 10,579,358 B2
(45) Date of Patent: Mar. 3, 2020

(54) SPACE-OPTIMIZED SOFTWARE INSTALLATION USING IN-PLACE EXTRACTABLE ARCHIVE IMAGE

(71) Applicant: Cisco Technology, Inc., San Jose, CA (US)

(72) Inventors: Avaneesh Anandrao Kadam, San Jose, CA (US); Ming-Wu Cheng, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 361 days.

(21) Appl. No.: 15/348,355

(22) Filed: Nov. 10, 2016

(65) Prior Publication Data
US 2018/0129491 A1    May 10, 2018

(51) Int. Cl.
*G06F 16/00* (2019.01)
*G06F 8/61* (2018.01)
*G06F 16/11* (2019.01)
*G06F 16/16* (2019.01)
*G06F 16/17* (2019.01)

(52) U.S. Cl.
CPC .............. *G06F 8/63* (2013.01); *G06F 16/113* (2019.01); *G06F 16/162* (2019.01); *G06F 16/1727* (2019.01)

(58) Field of Classification Search
CPC .... G06F 11/1435; G06F 8/71; G06F 11/1433; G06F 8/63; G06F 11/1407; G06F 12/0804; G06F 17/30138; G06F 17/30144; G06F 17/30722; G06F 2201/885; G06F 8/60; G06F 21/126; G06F 3/0608; G06F 16/113; G06F 16/162; G06F 16/1727

USPC .................................................. 707/600–899
See application file for complete search history.

(56) References Cited

U.S. PATENT DOCUMENTS

| | | | | |
|---|---|---|---|---|
| 7,389,505 B2 * | 6/2008 | Berenberg | .............. | G06F 8/656 717/172 |
| 8,495,316 B2 * | 7/2013 | Nagarkar | ............ | G06F 9/45533 711/162 |
| 8,713,556 B2 * | 4/2014 | Bozak | ........................ | G06F 8/65 717/170 |
| 8,996,667 B2 * | 3/2015 | Clerc | .................... | G06F 9/4416 709/222 |
| 9,058,235 B2 * | 6/2015 | Fontignie | .................. | G06F 8/63 |
| 9,411,871 B2 * | 8/2016 | Wade | ...................... | G06F 3/061 |

(Continued)

OTHER PUBLICATIONS

"Untaring in place?", http://www.linuxquestions.org/questions/linux-software-2/untaring-in-place-449382/, 2006, 5 pages, Accessed on Aug. 19, 2016, LinuxQuestions.org.

*Primary Examiner* — Michelle N Owyang
(74) *Attorney, Agent, or Firm* — Behmke Innovation Group LLC; James Behmke; Stephen D. LeBarron (57) ABSTRACT

In one embodiment, a device in a network stores an archive image to a storage location of the device. The archive image comprises a plurality of compressed files. For one or more of the files, the device copies a segment of a particular file in the archive image to a segment copy in the storage location of the device and deletes the segment of particular file from the archive image. The device repeats the copying and deleting steps until the particular file has been fully deleted from the archive image. The device reconstitutes the particular file by merging the segment copy with one or more other segment copies associated with the particular file.

20 Claims, 9 Drawing Sheets

(56) References Cited

U.S. PATENT DOCUMENTS

| | | | | |
|---|---|---|---|---|
| 10,007,671 | B1* | 6/2018 | Bono | G06F 16/128 |
| 2004/0243763 | A1* | 12/2004 | Peters | G06F 11/1076 |
| | | | | 711/114 |
| 2006/0112113 | A1* | 5/2006 | Gu | G06T 7/97 |
| 2014/0172783 | A1* | 6/2014 | Suzuki | G06F 8/63 |
| | | | | 707/609 |
| 2016/0371105 | A1* | 12/2016 | Sieffert | G06F 9/45545 |
| 2017/0090903 | A1* | 3/2017 | Bainville | G06F 8/71 |

* cited by examiner

SPACE-OPTIMIZED SOFTWARE INSTALLATION USING IN-PLACE EXTRACTABLE ARCHIVE IMAGE

TECHNICAL FIELD

The present disclosure relates generally to computer networks, and, more particularly, to software installation in space-constrained systems.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. As such, devices on a sensor network typically lack sufficient space to enable large operations, requiring large amounts of memory, to occur. For example, if an LLN device requires a new operating system, sufficient memory normally does not exist on the device to install the new system. It may even be difficult to provide an upgrade to the current operating system. Often, replacement of the device or components is the most efficient alternative to installing a new or upgraded operating system.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network stores an archive image to a storage location of the device. The archive image comprises a plurality of compressed files. For one or more of the files, the device copies a segment of a particular file in the archive image to a segment copy in the storage location of the device and deletes the segment of particular file from the archive image. The device repeats the copying and deleting steps until the particular file has been fully deleted from the archive image. The device reconstitutes the particular file by merging the segment copy with one or more other segment copies associated with the particular file.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
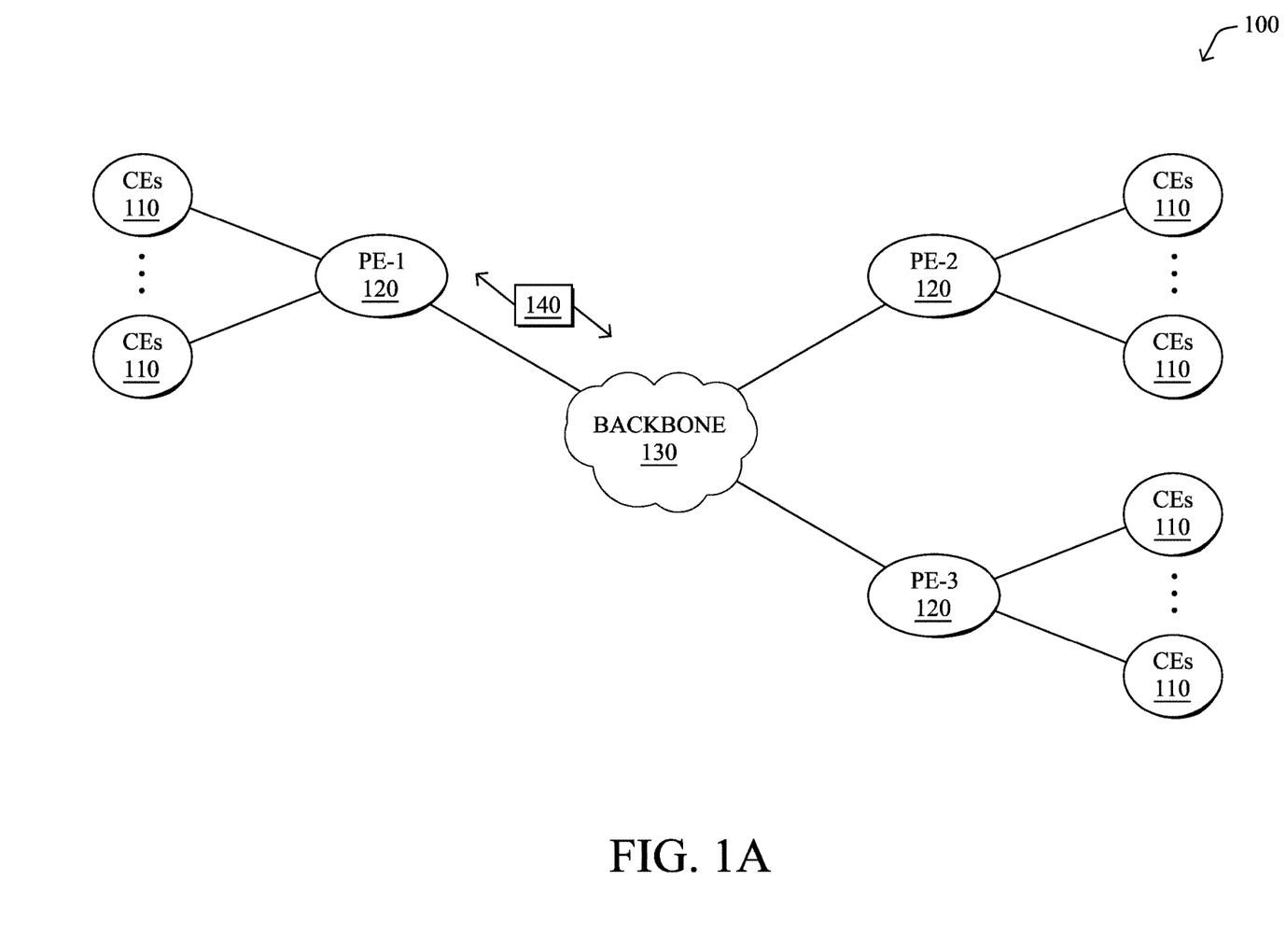
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
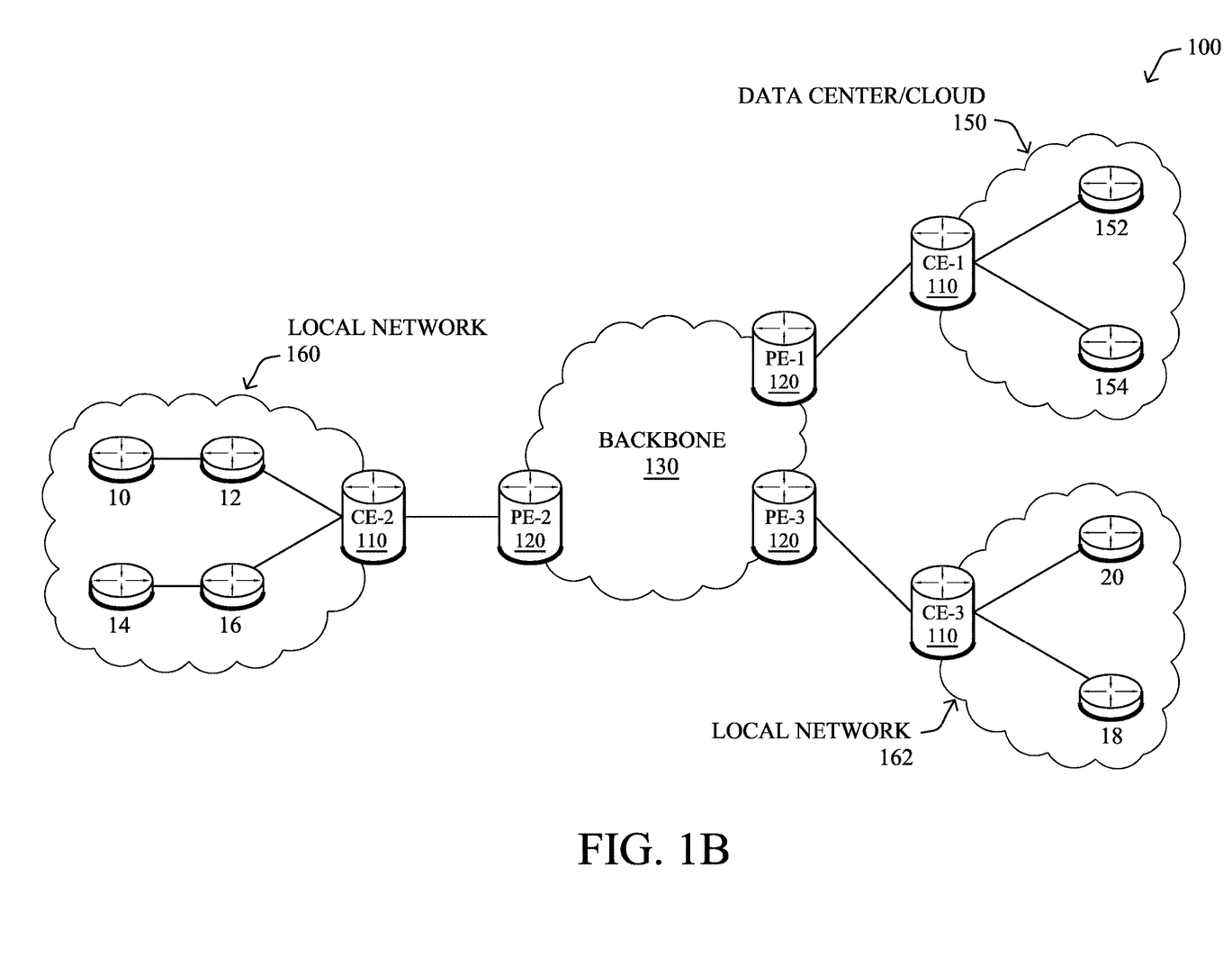

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, networks 160, 162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), etc. As would be appreciated, network 100 may include any number of local networks, data centers, cloud environments, devices/nodes, servers, etc.

In some embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
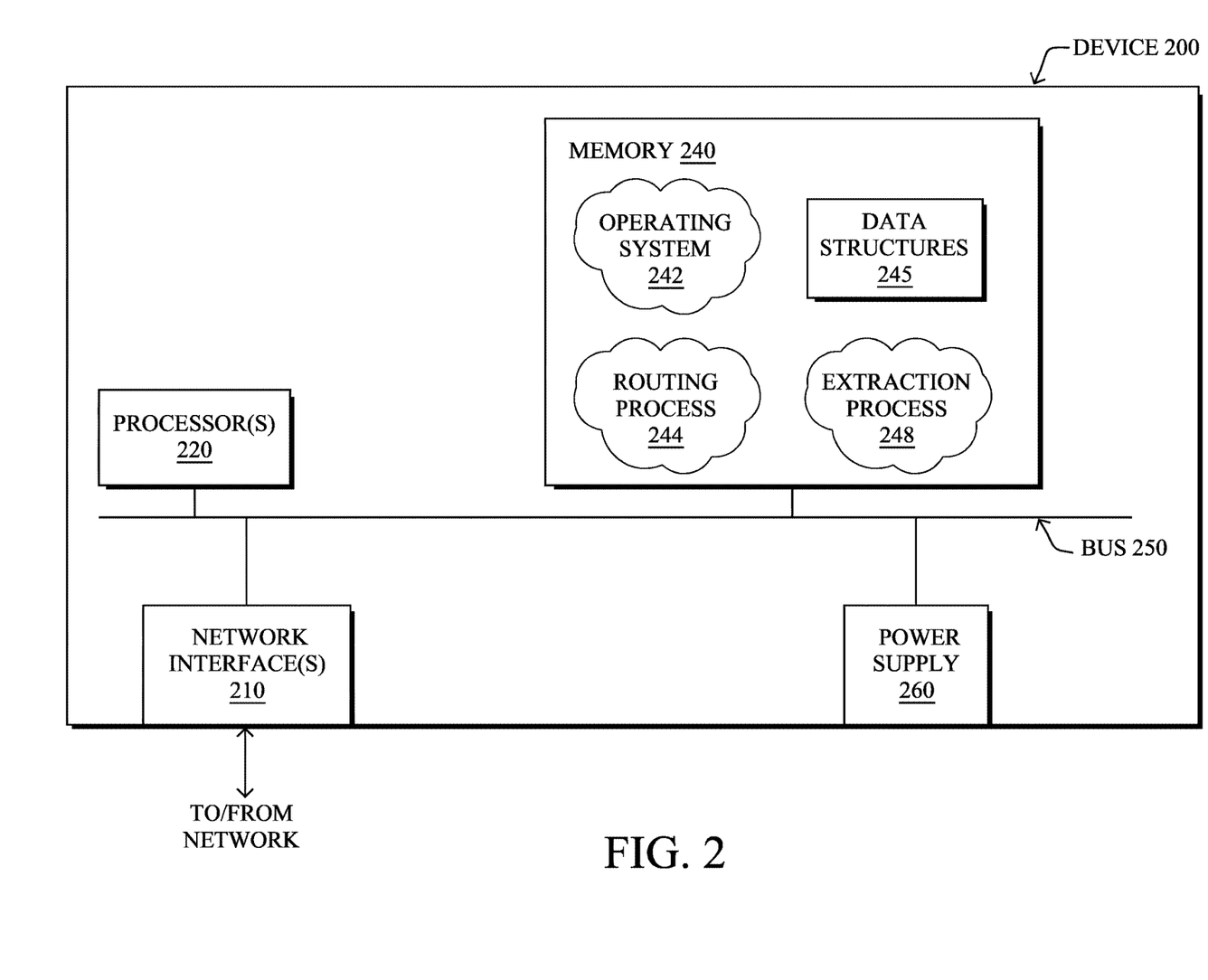
FIG. 2 illustrates an example network device/node.

FIG. 2 is a schematic block diagram of an example node/device 200 that may be used with one or more embodiments described herein, e.g., as any of the computing devices shown in FIGS. 1A-1B, such as nodes/device 10-20, servers 152-154 (e.g., a network controller located in a data center, etc.), and any other computing device that supports the operations of network 100 (e.g., switches, etc.). The device 200 may also be any other suitable type of device depending upon the type of network architecture in place, such as IoT nodes, etc. Device 200 may comprise one or more network interfaces 210, one or more processors 220, and a memory 240 interconnected by a system bus 250, and is powered by a power supply 260.

The network interfaces 210 include the mechanical, electrical, and signaling circuitry for communicating data to network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art. Note, further, that the nodes/devices may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor, functionally organizes the node by, inter alia, invoking network operations in support of software processors and/or services executing on the device. These software processors and/or services may comprise, routing process 244 (e.g., routing services) and illustratively, extraction process 248. In some embodiments, extraction process 248 may include computer executable instructions that, when executed, such as by processor 220, may cause device 200 to perform extraction and storage of an archive image to a storage location of the device, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, as noted above, Low power and Lossy Networks (LLNs), such as sensor networks, have various challenges, including low memory, low processing capability, etc. As such, devices on a sensor network typically lack sufficient space to enable large memory operations to occur, such as the installation of a new operating system or upgrading of a current operating system (such as operating system 242). This is particularly true for archive images. For example, it is common practice to release bundled software images using archive methods. Resulting archive images (sometimes also referred to as consolidated files or archive files) comprise multiple files and may use specific formats (such as .bin) to hold multiple software components. Installation procedures may make use of such package formats in order to install and/or upgrade the software. Such component files themselves can be mountable (e.g., ISO/squashFS) so that they provide software components of an operating system. Having separate mountable files makes it possible to only upgrade parts of the operating system when a full system upgrade is not required.

Figure 3:
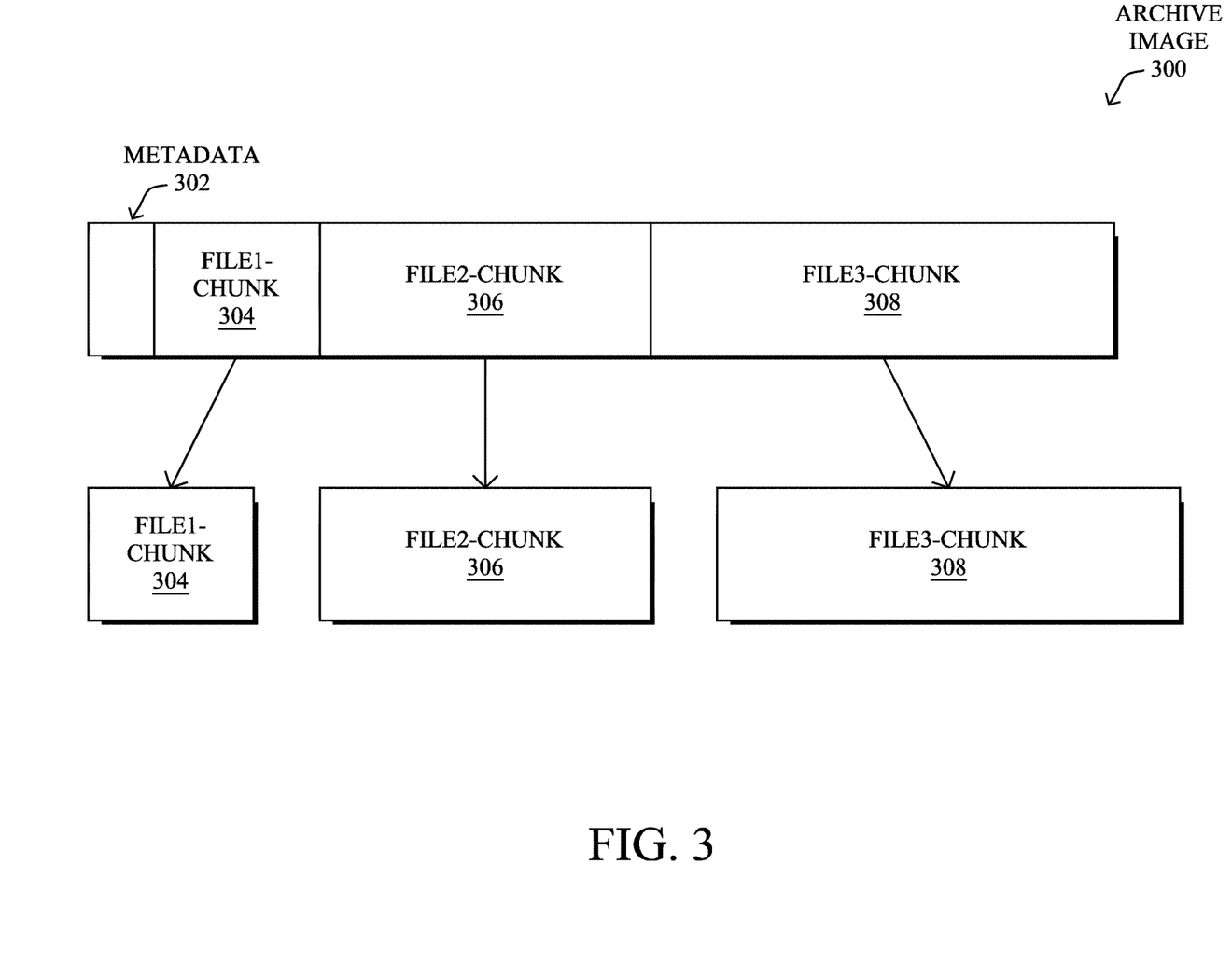
FIG. 3 illustrates an example archive image.

An example archive image (e.g. an install file for upgrading a device operating system, an application of the device, a configuration of the device, etc.) is shown in FIG. 3. In some embodiments, archive image 300 may include one or more component files, such as file 1-chunk 304, file 2-chunk 306, and file 3-chunk 308, each to be installed on a device (e.g. device 200). As also shown, the archive image may further include metadata 302 relating to each component. Such metadata may include, for example, the starting offset of a component file chunk, the size of the component file, and the name/path of the component file. The metadata for each component file may be encoded into the archive image, with the actual encoding of such information generally being left to implementation. For example, in one embodiment, the metadata is placed at the start of archive image.

One of the steps during installation of an archive image is to extract the contents into individual component files on the target device, as shown in FIG. 3. However, this extraction and separation operation consumes considerable extra disk space or memory (such as memory 240), since the files are essentially duplicated in the same memory. Thus, the amount of disk space required for installing an archive image is typically twice the archive image/bundle size. Unfortunately, as noted, embedded systems and other LLN devices (e.g., sensor devices within a sensor network) typically have limited disk/flash space. This imposes considerable limitations on the size of installation package.

Space-Optimized Software Installation Using In-Place Extractable Archive Image

The techniques herein allow for software installation using archive images, even if the target device does not have sufficient space to hold additional extracted files. In some aspects, an in-place extraction process is utilized that makes use of a temporary buffer space adjustable for the device. Segments of a particular component file from an archive image may be copied into a storage location of a device and may then be deleted from the component file. Additional copying and deleting cycles may be repeated until the entire component file has been installed on the device. In this way, it is possible to extract the contents of a large archive image, which may comprise multiple files and/or folders, using only a small buffer space available on the device.

Illustratively, the techniques described herein may be performed by hardware, software, and/or firmware, such as in accordance with extraction process 248, which may include computer executable instructions executed by the processor 220 (or independent processor of interfaces 210) to perform functions relating to the techniques described herein.

Specifically, according to various embodiments, a device in a network stores an archive image to a storage location of the device. The archive image may comprise a plurality of compressed files. For one or more of the files, the device copies a segment of a particular component file of the archive image to produce a segment copy in the storage location of the device and deletes the segment of the particular file from the archive image. The device repeats the copying and deleting steps until the particular file has been fully deleted from the archive image. The device reconstitutes the particular file by merging the segment copy with one or more other segment copies associated with the particular file.

Figure 4A:
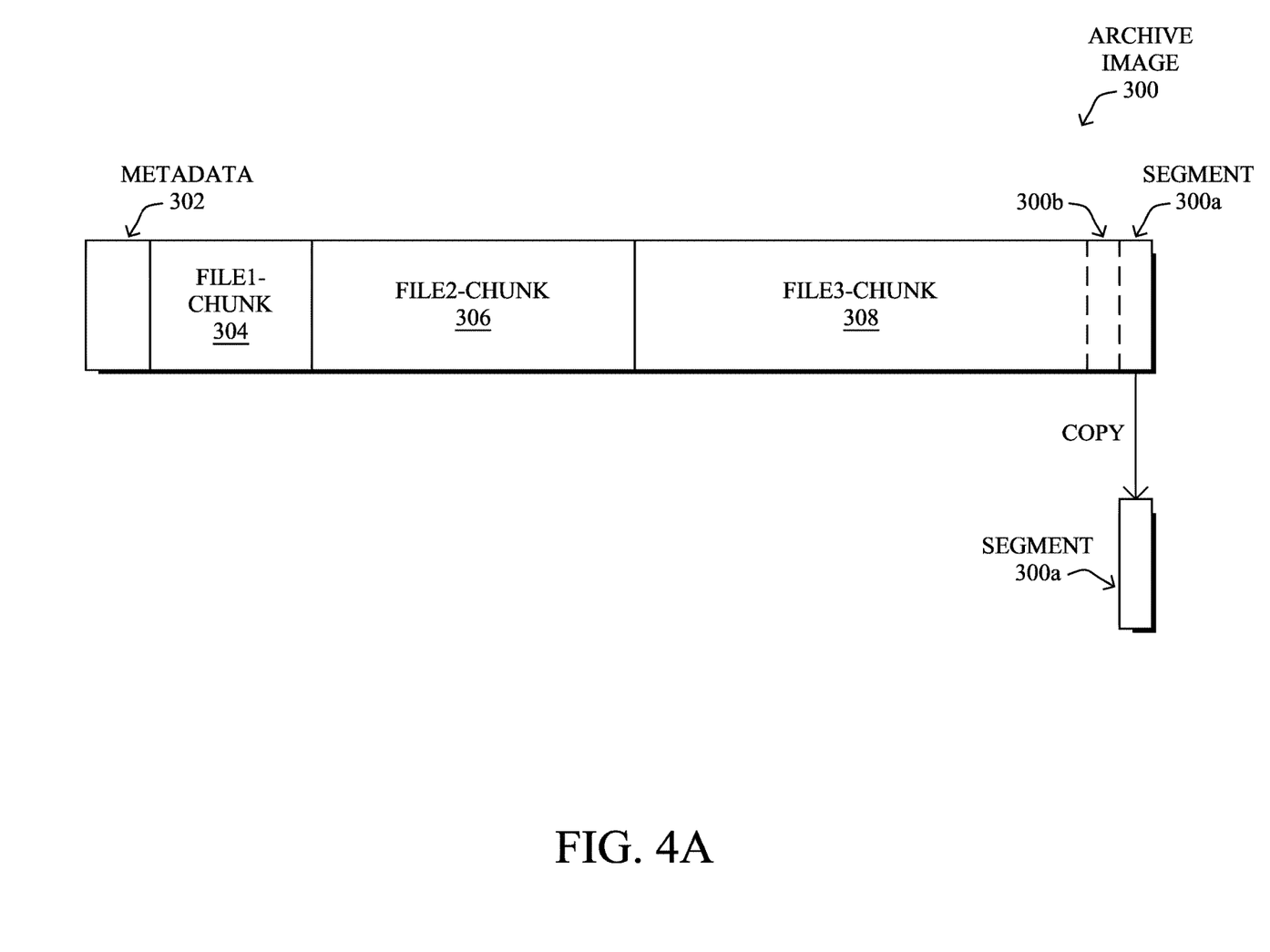
FIG. 4A-4B illustrates an example copying and deleting of a segment.
Figure 4B:
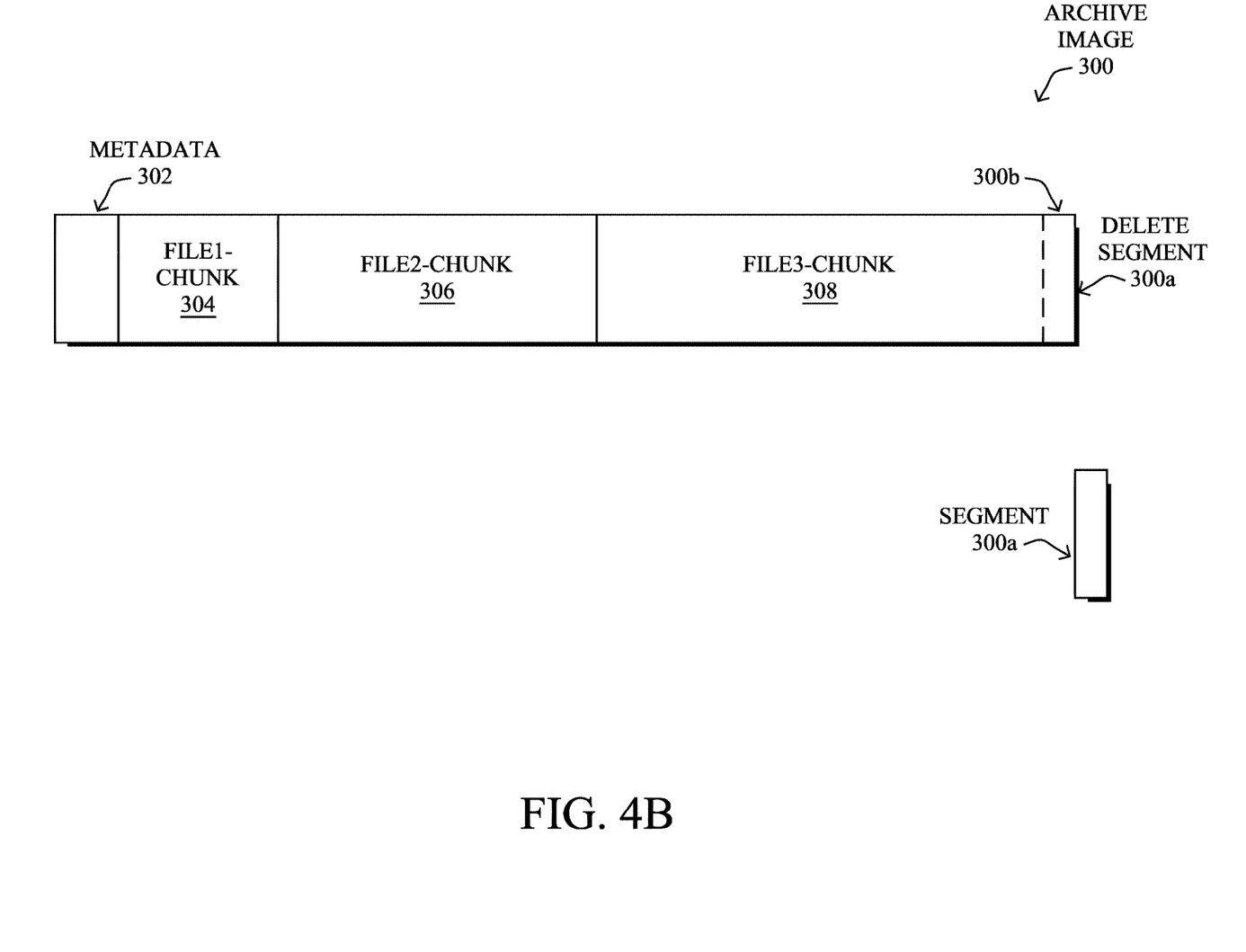

Operationally, FIGS. 4A-4B illustrate an example of the extraction of an archive image using the techniques herein. As generally shown, archive image 300 is provided that comprises metadata 302 and multiple compressed component files, file 1-chunk 304, file 2-chunk 306, and file 3-chunk 308, to be installed on a device in a network. Such a file may be provided, for example, by another device in the network, such as a supervisory device. In order to install this archive image file to the device without consuming excessive memory space, according to various embodiments of the present disclosure, a portion/segment of a component file may be copied to a segment copy (e.g., a temporary file) in a storage location of the device (such as memory 240).

In particular, as shown in FIG. 4A, the device may make a copy of segment 300a of component file 308 to local disk. The size of the segment (e.g., the buffer size) may vary depending, for example, on the available resources of the storage location. The smaller the size of the copied segment, the more segment files may be copied, in embodiments of the present disclosure—i.e., the number of segment files=the size of the component file/segment copy size. If the device has limitations on the number of files it can hold, the size of the segment copy may be increased while, if the device has limitations on buffer size, a smaller segment of the component file may be copied, in various embodiments. In this way, the size of the segment to be copied may be a compromise between the additional space needed to store the segment copy and the number of files needed to transfer the component file and can be customizable depending, for example, on various device features.

In some embodiments, the segment to be copied may be from an end of the component file and, more particularly, from an end of the archive image. For example, as shown in FIG. 4A, segment 300a is at the tail end (e.g., the end opposite to metadata 302) of component file 308, which itself is at the end of archive file 300. The location of the segment to be copied may be determined based on the metadata 302 of the archive image. For example, metadata 302 may include file information, including component file offset, the size of the component file, and/or the name/path of the individual component file. In some embodiments, metadata for each component file may be encoded in the archive image, although actual encoding of such information may be left to implementation. One example, shown in FIG.

4A, would be to place metadata information at the start of archive bundle which can be decoded and used in the techniques described herein.

Upon copying the segment of the component file to a segment copy, that segment may be deleted from the archive file, in embodiments of the present disclosure. In other words, the bits in memory that comprise the segment may be cleared from the memory of the device after being copied to the buffer location, thereby freeing the memory location(s) consumed by the segment in the archive for other uses (e.g., the memory locations storing the segment in the archive may be cleared immediately or marked as being able to be overwritten).

For example, as shown in FIG. 4B, segment 300a may be deleted from component file 308 upon copying segment 300a. By truncating the component file by the amount of the segment copied, the space used (e.g. the buffer space) can be reclaimed—that is, at any given time, the only increase in space needed is the size of the copied segment, which is reclaimed when the segment is deleted. The total space utilization is therefore constant since a copy segment is created and the segment copied is then deleted. Copying and deleting may be repeated, such as by copying segment 300b to a segment copy and, once copied, deleting segment 300b from component file 308. The component file (as well as the corresponding archive image) therefore shrinks in size while the number of copied files grows.

Figure 5A:
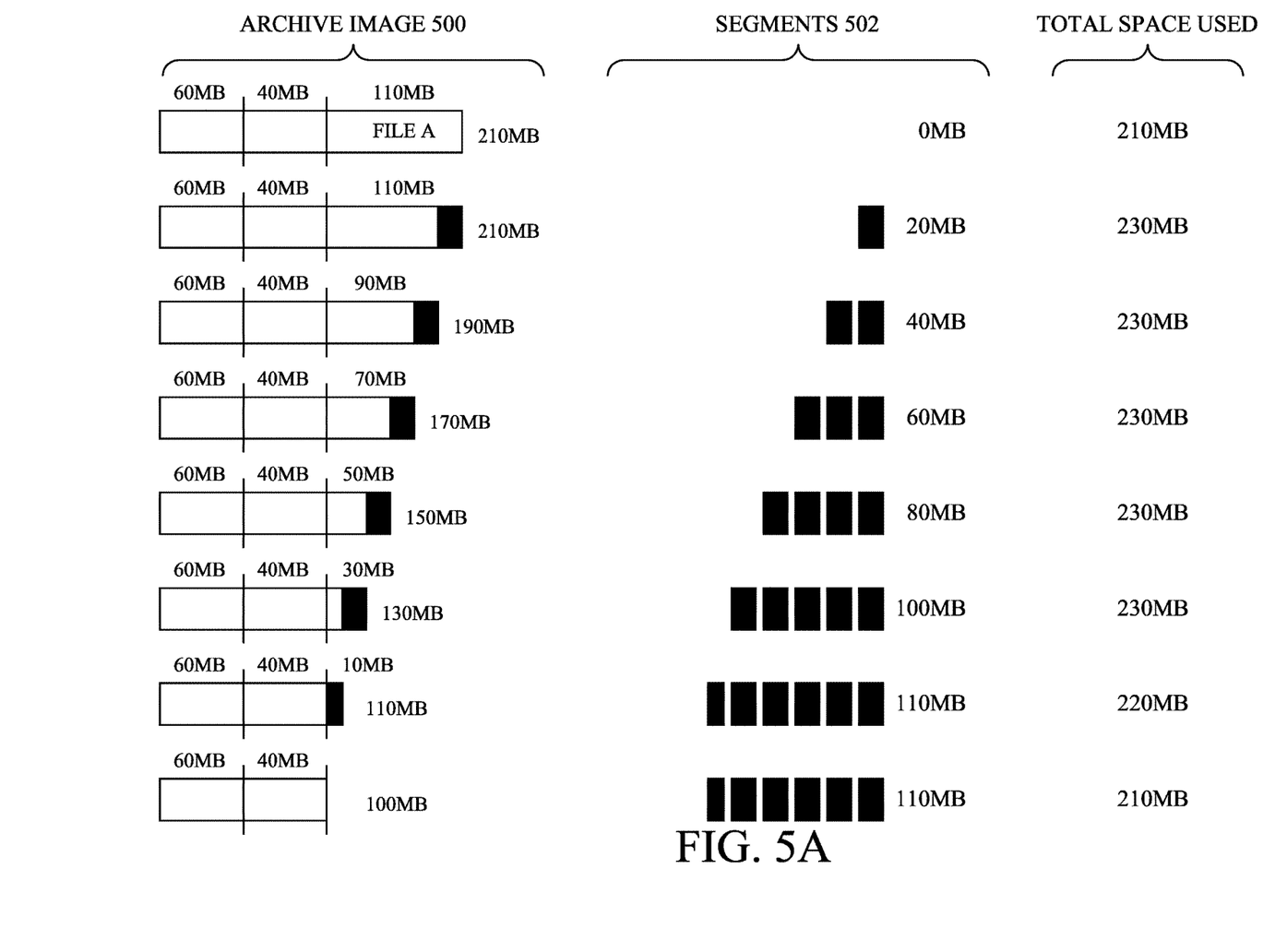
FIG. 5A-5B illustrates an example reconstituting of a file.

A specific example of this technique is shown in FIG. 5A. As shown, archive image 500, having a bundle size of 210 MB, comprises three separate component files having identifiable sizes (e.g. from metadata), as shown. For example, component File A is 110 MB in size. To store this archive file to a storage location of a device, according to some embodiments of the present disclosure, the device may copy segments of File A to a segment copy 502 in the device storage location. The size chosen of each segment may be selected, for example, based on various features of the device described above. In this particular example, each segment is 20 MB in size (e.g., the buffer size).

When the first segment is copied, the total space used increases to 230 MB (the size of archive image plus the size of the copied segment 502). The segment that was copied from File A can then be deleted from the archive image, reducing its size to 190 MB (and reducing the size of File A to 90 MB). Another segment, having a size of 20 MB, can then be copied from File A, temporarily increasing the total space used back to 230 MB, and the copied segment deleted from archive image 500 to further reduce the size of the archive image and File A and to, again, reclaim the increase in space.

As shown in FIG. 5A, by this technique, segments of File A of archive image 500 are gradually copied and deleted, increasing the number of segments 502 but not increasing the total space used above the sum of the archive image size and the segment size. By comparison, storing an archive image file of 210 MB to a storage location of a device using current techniques would have required twice the file space (i.e., 420 MB), which may not be available on some devices, particularly an LLN device.

Figure 5B:
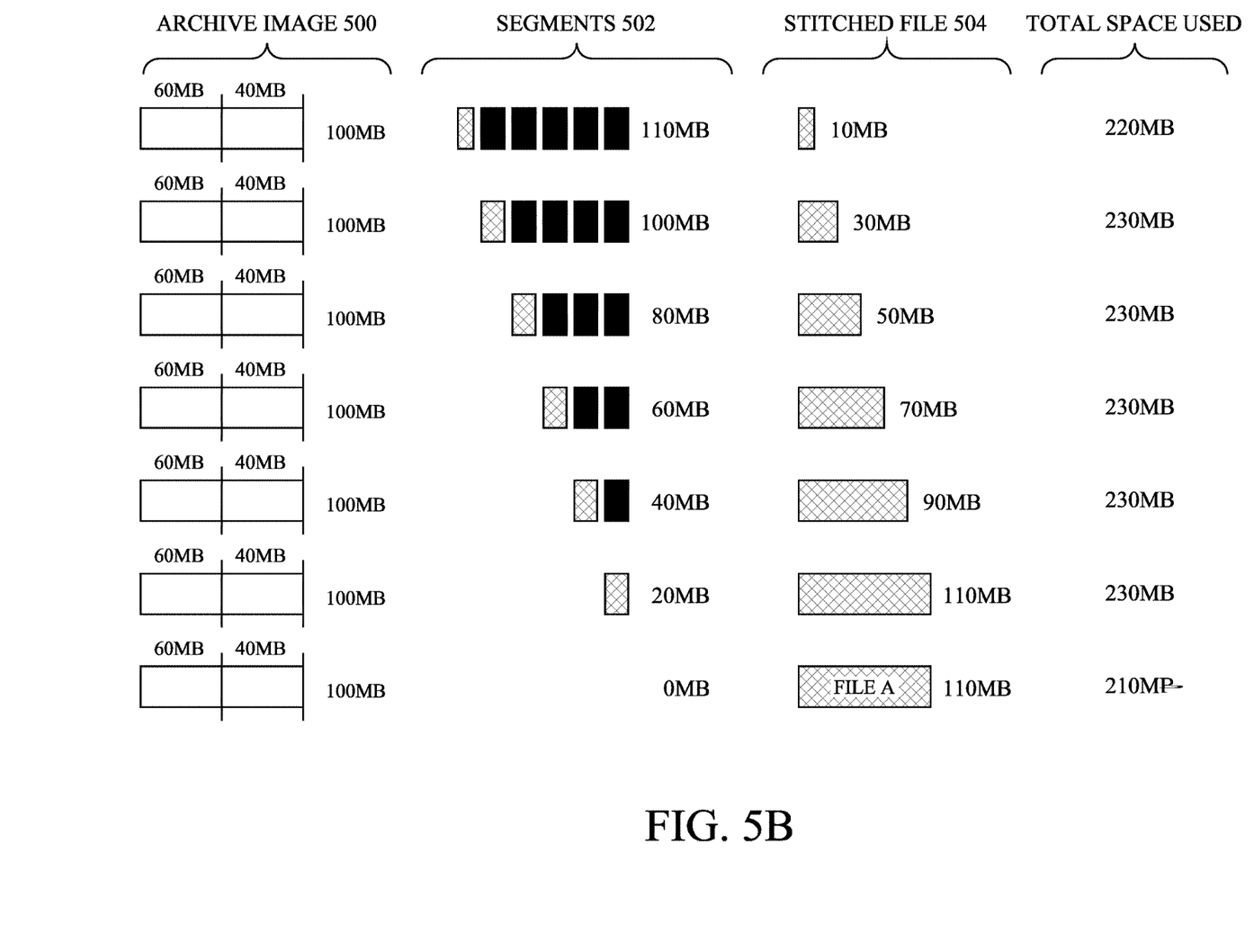

In some embodiments, the segment copies may be merged/stitched back together in order to reconstitute the complete component file at the storage device. Generally speaking, reconstituting the complete component file refers to the memory operation of forming a sequence in physical memory of the bits in the segments such that their reconstituted sequence is identical to that of the original component file in the archive (i.e., without modification). Such a sequence may be formed either physically (e.g., using a block of adjacent memory locations) or logically (e.g., using a series of memory pointers. Merging of the copied segments may occur after the entire component file has been copied into separate segments or may occur while the segments are being copied and deleted. In addition, separate segments may be stitched together in any order, as long as the reconstituted component file is the same as the component file from the archive image. For example, as shown in FIG. 5B, after the component file from archive image 500 has been copied to segments 502, each segment may be recombined to form stitched files 504. In the embodiment shown, the stitched file is formed by recombining segments in the opposite order in which they were copied—i.e., the last segments that were copied are the first to be recombined, although other combination orders may be used. Segments copies may be merged with one or more other segment copies until the component file (e.g., File A) is reconstituted on the device. Note that the total space used again remains low, similar to the copying/deleting technique. For example, the total space does not increase above the total of the component file size and the buffer/segment size.

The techniques described herein allow "near" in-place extraction of an archive bundle (e.g., an archive image file comprising compressed component files). A customizable temporary buffer, having a size chosen based on features of the device onto which the file is to be transferred, can be tuned to suit system conditions and can be dynamically optimized depending on, for example, the available free space of the storage location, resulting in optimum use of available space. In addition, no special OS/kernel/file system support is required, and the techniques herein enable use of POSIX standard file handling APIs.

In further embodiments, if the device uses the Unix File System (UFS), it may leverage the inode pointer structure of UFS, to extract files from an archive. Notably, from the metadata of the archive image, the device knows the starting offsets of any sub-files within the archive. In some embodiments, the device may loop over the inodes of the current archive file and create new inodes while adjusting the disk block locations. In other words, the device may create a symbolic link (e.g., a pointer) to the offset of the file in the archive and then just remove the original inode. While this technique may provide even faster operations than the techniques above, it would also require modification to the file system of the device to support this operation, which may be undesirable from security and maintenance standpoints.

Figure 6:
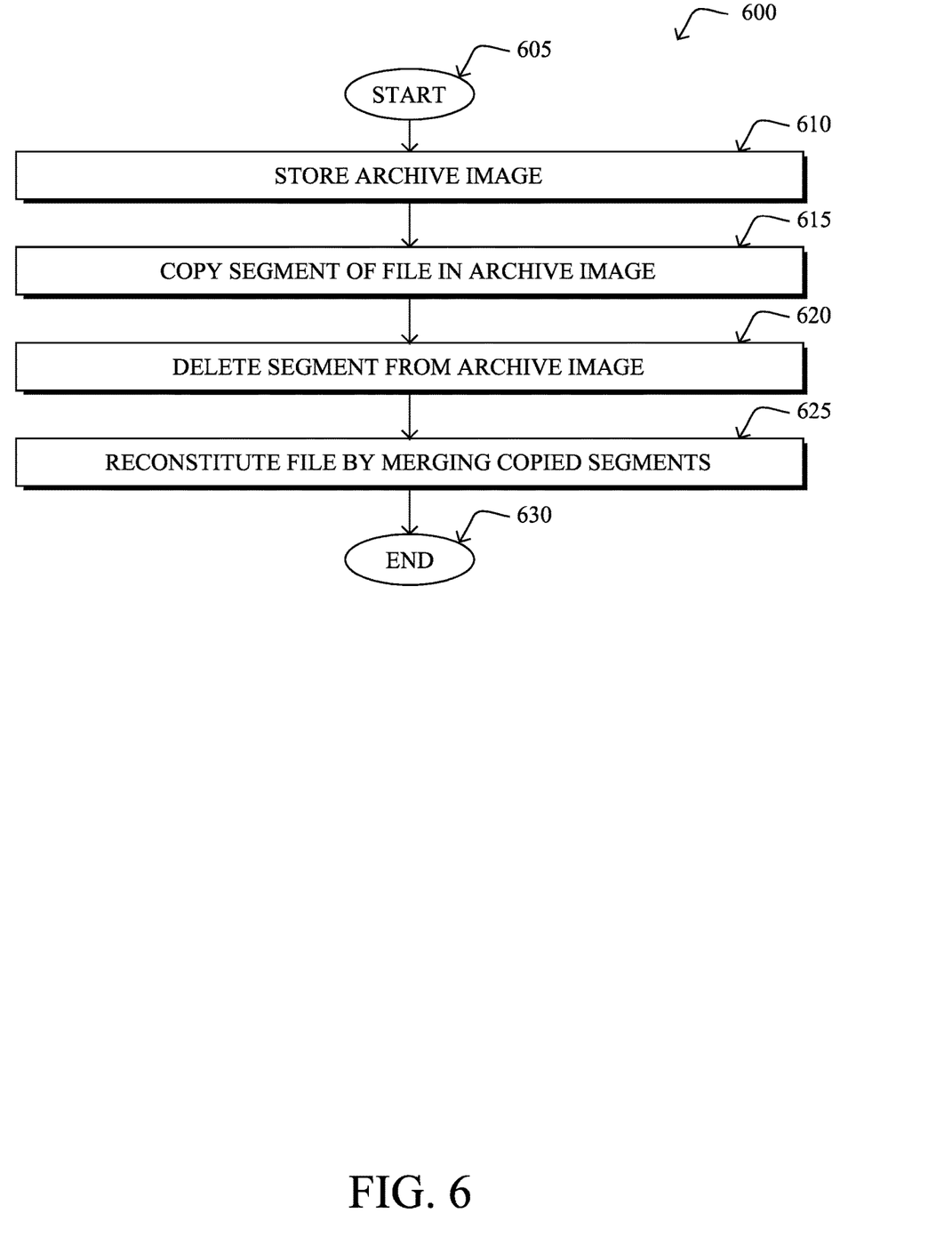
FIG. 6 illustrates an example simplified procedure for storing an archive image.

FIG. 6 illustrates an example simplified procedure for extraction and storage of an archive file, in accordance with various embodiments herein. Generally, procedure 600 may be performed by any non-generic, specialized device in a network (e.g., device 200), such as a device in a Low-Power and Lossy Network (LLN) or other constrained network by executing stored instructions. Procedure 600 may start at step 605 and continues on to step 610 where, as described in greater detail above, a device in the network may store an archive image to a storage location of the device. The archive image (e.g., archive image 300) may comprise a plurality of compressed files (e.g., component file-chunks 304, 305, and 306) and may be provided to the device by another device in the network such as a supervisory device.

In step 615, for one or more of these component files, the device may copy a segment of a particular file to a segment copy in a storage location of the device, as described in various embodiments above. The size of the segment copy (e.g., the buffer size) may be chosen or customized based on features of the device. For example, if the device has limitations on the number of files allowed, the segment copy size may be increased while, if the device has limitations on buffer size, a smaller segment copy may be copied to the storage location. For example, the archive image may be, but not limited to, a .rpm file, a .deb file, a .bin file, a .tar.gz file, or any other archive image file.

In step 620, the device may also delete the segment from the component file. As described in more detail above, the device may truncate the component file in the archive by the amount of space used for the segment copy, and, in this way, the space (e.g., the buffer space) may be reclaimed. In some embodiments, the copying of segments to segment copies followed by deleting of the segments from the component file may be repeated until the entire component file is copied to segment copies and the copied component file is deleted from the archive file, effectively transferring the component file in segments to the storage location.

In step 625, as described above, the device may reconstitute the component file by merging/stitching the segment copy with one or more other segment copies associated with the file. In this way, stitched files (e.g., stitched files 504) may be formed without the need for addition space/memory, and the particular component file (e.g., File A) may be reconstituted/transferred to the storage location of the device. The techniques provided (e.g., copy/delete/reconstitute) may be repeated as needed for additional component files of the archive image. Procedure 600 then ends at step 630, such as when all desired component files have been extracted.

It should be noted that while certain steps within procedure 600 may be optional as described above, the steps shown in FIG. 6 are merely examples for illustration, and certain other steps may be included or excluded as desired. Further, while a particular ordering of the steps is shown, this ordering is merely illustrative, and any suitable arrangement of the steps may be utilized without departing from the scope of the embodiments herein.

The techniques described herein, therefore, provide concise installation of bundled archive images, particularly in space-starved systems. By copying a component file to segment copies, having a size customized for the storage location of the device, and deleting the copied segments from the component file, transfer of the entire archive image may occur without significant increase in memory usage. Thus, software images published in archived bundle form can be readily stored on various devices in a network, (e.g, an LLN) without excessive and/or unavailable storage requirements. Many new features are being added to archive images, which increase installation bundle size, and the techniques described above enable these files to be effectively installed/updated without increasing flash/disk size requirements on devices/switches/routers.

While there have been shown and described illustrative embodiments that provide for storing an archive image to a storage location of a device, it is to be understood that various other adaptations and modifications may be made within the spirit and scope of the embodiments herein. For example, while certain embodiments are described herein with respect to using certain devices in an LLN, the embodiments may, in fact, be used in any type of network in which device storage requirements are limited. Also, the archive images may be provided by supervisory devices within the network as well as from device external to the network of the device.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    storing, by a device in a network, an archive image to a storage location of the device, wherein the archive image comprises a plurality of compressed files, wherein the storage location upon storing the archive image does not have enough space to store a duplicate copy of the archive image during an installation; and
    upgrading a process within an operating system of the device by installing the archive image via an extraction technique, the extraction technique applied to one or more files within the archive image, wherein installing includes:
        copying, by the device, a segment of a particular file of the compressed files in the archive image to a segment copy in a storage location of the device, wherein the segment of the particular file is less than the entire particular file;
        deleting, by the device, the segment of the particular file from the archive image before a next segment in the particular file is copied and deleted;
        repeating, by the device, the copying and deleting steps until the particular file has been fully deleted from the archive image; and
        reconstituting, by the device, the particular file by merging the segment copy with one or more other segment copies associated with the particular file.

2. The method as in claim 1, wherein the device comprises one of: a network switch, a network router, or a Low-Power and Lossy Network (LLN) device.

3. The method as in claim 1, wherein the archive image comprises an operating system update.

4. The method as in claim 1, further comprising:
    receiving, at the device, the archive image from a supervisory device in the network.

5. The method as in claim 1, further comprising:
    selecting, by the device, a size of the segment based on an available amount of space in the storage location.

6. The method as in claim 5, wherein the size of the segment is equal to the available amount of space in the storage location.

7. The method as in claim 1, further comprising:
    identifying, by the device, the particular file in the archive image by analyzing metadata from the archive image.

8. An apparatus, comprising:
    one or more network interfaces to communicate with a network;
    a processor coupled to the network interfaces and configured to execute one or more processes; and
    a memory configured to store a process executable by the processor, the process when executed operable to:
        store an archive image to a storage location, wherein the archive image comprises a plurality of compressed files, wherein the storage location upon storing the archive image does not have enough space to store a duplicate copy of the archive image during an installation; and upgrading a process within an operating system of the apparatus by installing the archive image via an extraction technique, the extraction technique applied to one or more files within the archive image, wherein installing includes:

copying a segment of a particular file of the compressed files in the archive image to a segment copy in the storage location, wherein the segment of the particular file is less than the entire particular file;

deleting the segment of the particular file from the archive image before a next segment in the particular file is copied and deleted;

repeating the copying and deleting steps until the particular file has been fully deleted from the archive image; and reconstituting the particular file by merging the segment copy with one or more other segment copies associated with the particular file.

9. The apparatus as in claim 8, wherein the apparatus comprises one of: a network switch, a network router, or a Low-Power and Lossy Network (LLN) device.

10. The apparatus as in claim 8, wherein the archive image comprises an operating system update.

11. The apparatus as in claim 8, wherein the process when executed is further operable to:

receive the archive image from a supervisory device in the network.

12. The apparatus as in claim 8, wherein the process when executed is further operable to:

select a size of the segment based on an available amount of space in the storage location.

13. The apparatus as in claim 12, wherein the size of the segment is equal to the available amount of space in the storage location.

14. The apparatus as in claim 8, wherein the process when executed is further operable to:

identify the particular file in the archive image by analyzing metadata from the archive image.

15. A tangible, non-transitory, computer-readable medium storing program instructions that cause a device in a network to execute a process comprising:

storing, by the device, an archive image to a storage location of the device, wherein the archive image comprises a plurality of compressed files, wherein the storage location upon storing the archive image does not have enough space to store a duplicate copy of the archive image during an installation; and upgrading a process within an operating system of the device by installing, by the device, the archive image via an extraction technique, the extraction technique applied to one or more files within the archive image, wherein installing includes:

copying, by the device, a segment of a particular file of the compressed files in the archive image to a segment copy in the storage location of the device, wherein the segment of the particular file is less than the entire particular file;

deleting, by the device, the segment of the particular file from the archive image before a next segment in the particular file is copied and deleted;

repeating, by the device, the copying and deleting steps until the particular file has been fully deleted from the archive image; and reconstituting, by the device, the particular file by merging the segment copy with one or more other segment copies associated with the particular file.

16. The computer-readable medium as in claim 15, wherein the device comprises one of: a network switch, a network router, or a Low-Power and Lossy Network (LLN) device.

17. The computer-readable medium as in claim 15, wherein the archive image comprises an operating system update.

18. The computer-readable medium as in claim 15, wherein the process further comprises:

selecting, by the device, a size of the segment based on an available amount of space in the storage location.

19. The computer-readable medium as in claim 18, wherein the size of the segment is equal to the available amount of space in the storage location.

20. The computer-readable medium as in claim 15, wherein the process further comprises:

identifying, by the device, the particular file in the archive image by analyzing metadata from the archive image.

* * * * *